United States Patent
Verrat-Debailleul et al.

(10) Patent No.: US 10,051,691 B2
(45) Date of Patent: *Aug. 14, 2018

(54) COOKTOP WITH WINDOW AND END PLATE, COOKING APPLIANCE, AND METHOD FOR MANUFACTURING THE COOKTOP

(71) Applicant: EUROKERA S.N.C., Chateau Thierry (FR)

(72) Inventors: Adele Verrat-Debailleul, Villers-sur-Coudun (FR); Gerard Huchet, Autreches (FR); Beatrice Mottelet, Compiegne (FR); Gaelle Ferriz, Reims (FR)

(73) Assignee: EUROKERA S.N.C, Chateau Thierry (FR)

( * ) Notice: Subject to any disclaimer, the term of this patent is extended or adjusted under 35 U.S.C. 154(b) by 292 days.

This patent is subject to a terminal disclaimer.

(21) Appl. No.: 14/647,370

(22) PCT Filed: Nov. 25, 2013

(86) PCT No.: PCT/FR2013/052840
§ 371 (c)(1),
(2) Date: May 26, 2015

(87) PCT Pub. No.: WO2014/080146
PCT Pub. Date: May 30, 2014

(65) Prior Publication Data
US 2015/0312966 A1    Oct. 29, 2015

(30) Foreign Application Priority Data
Nov. 26, 2012  (FR) ..................... 12 61219

(51) Int. Cl.
*H05B 3/68* (2006.01)
*H05B 3/74* (2006.01)
(Continued)

(52) U.S. Cl.
CPC ....... *H05B 3/746* (2013.01); *B29C 45/14008* (2013.01); *B29C 45/14467* (2013.01);
(Continued)

(58) Field of Classification Search
CPC .......... F24C 3/124; F24C 3/126; F24C 7/083; F24C 15/10; F24C 15/08; H05B 3/74;
(Continued)

(56) References Cited

U.S. PATENT DOCUMENTS

| 6,398,903 B1 | 6/2002 | Stedron et al. |
| 2014/0216435 A1 | 8/2014 | Mallet et al. |

FOREIGN PATENT DOCUMENTS

| DE | 10 2007 021 939 A1 | 11/2008 |
| DE | 102007021939 | * 11/2008 |

(Continued)

OTHER PUBLICATIONS

U.S. Appl. No. 14/346,200, filed Mar. 20, 2014, Patent App. Publication No. 2014-0216435, Mallet, et al.
(Continued)

*Primary Examiner* — Shawntina Fuqua
(74) *Attorney, Agent, or Firm* — Oblon, McClelland, Maier & Neustadt, L.L.P (57) ABSTRACT

A cooktop for a fixed or mobile cooking appliance, including a base plate, at least a part, or all, of a peripheral outer edge of a window being in the plane of a peripheral outer edge of the base plate, at least one end plate which is made of different material than that of a seal and is disposed above or on the seal, at least a part of an outer surface of the seal (Continued)

which is located between an outer surface of the base plate and an outer surface of the window being covered by the end plate.

14 Claims, 7 Drawing Sheets

(51) Int. Cl.
| | |
|---|---|
| *F24C 7/08* | (2006.01) |
| *B29C 45/14* | (2006.01) |
| *B29D 11/00* | (2006.01) |
| *B29K 83/00* | (2006.01) |
| *B29L 11/00* | (2006.01) |
| *B29L 31/00* | (2006.01) |

(52) U.S. Cl.
CPC .......... *B29D 11/0073* (2013.01); *F24C 7/083* (2013.01); *H05B 3/688* (2013.01); *H05B 3/74* (2013.01); *B29K 2083/00* (2013.01); *B29L 2011/00* (2013.01); *B29L 2031/778* (2013.01)

(58) Field of Classification Search
CPC .... H05B 3/746; H05B 3/688; B22D 19/0045; B29C 39/10; B29C 45/14008; B29C 45/14467; C03C 17/32; C03C 17/34; B29L 2031/768; B29L 2031/778; B29D 11/0073; B29K 2083/00
See application file for complete search history.

(56) References Cited

FOREIGN PATENT DOCUMENTS

| | | | |
|---|---|---|---|
| EP | 0570670 | * | 11/1993 |
| EP | 2 226 565 A1 | | 9/2010 |
| FR | 2 789 624 A1 | | 8/2000 |
| FR | 2789624 | * | 8/2000 |

OTHER PUBLICATIONS

U.S. Appl. No. 14/647,308, filed May 26, 2015, Verrat-Debailleul, et al.

International Search Report dated Mar. 19, 2014 in PCT/FR13/052840 Filed Nov. 25, 2013.

* cited by examiner

COOKTOP WITH WINDOW AND END PLATE, COOKING APPLIANCE, AND METHOD FOR MANUFACTURING THE COOKTOP

CROSS-REFERENCE TO RELATED APPLICATIONS

The present application based on PCT/FR13/052840 filed on Nov. 25, 2013, and is the U.S. counterpart of WO 2014/080146, and claims priority to French application no. 1261219 filed on Nov. 26, 2012, the entire contents of each of which are incorporated herein by reference.

FIELD OF THE INVENTION

The present invention relates to a cooking appliance having a cooktop and in particular to a fixed cooking appliance intended to be integrated into a bay provided in a work surface or in a stove, or to a mobile cooking appliance which can be moved manually and easily.

A cooking appliance having a cooktop has a cooktop, for example made of glass ceramic, on which a saucepan, a frying pan or any other type of cookware that is likely to contain foodstuffs to be heated up or cooked may be positioned, or even on which the foodstuffs to be heated up or cooked may be positioned directly.

This cooking appliance furthermore generally has a casing having a bottom and side walls that form a base within which one (or more) heating element(s) is (or are) positioned, for example one (or more) radiant or halogen heater (s), and also regulating means for varying the power thereof or even for programming when it (they) start(s) and stop(s). The cooktop closes the top of the casing.

The present invention relates more particularly to a cooktop for a fixed or mobile cooking appliance, having a base plate, in particular a glass-ceramic base plate, having at least one cooking area, and also having at least one control and/or information area, said control and/or information area being formed by a window that is separated from said base plate by at least one seal made of synthetic material.

BACKGROUND OF THE INVENTION

The production of a seal between a window, under which a screen is positioned, and the base plate is known, in particular from French patent application FR 2 746 904. The invention which is the subject of said document lies in the selection of the material of the seal so as to allow sealing between the window and the base plate.

Said document shows in FIG. 3 a screen which "floats in space"; no means for securing the screen is described. It is assumed that the screen is secured to the casing, but there is no information in this regard.

A first drawback of this configuration is that the seal is likely to be damaged by the heat emitted by a hot item of cookware which may be positioned very close to or even on top of it.

A second drawback of this configuration is that it is difficult to precisely position and secure the screen, in all three dimensions of space, with respect to the window which is located above it; however, this positioning is very important so as to ensure a perception of quality of the screen display through the window.

These two drawbacks are reinforced by the fact that the connection between the window and the base plate is a connection with permanent elasticity according to said document. However, this connection is weak with respect to the heat which may be emitted by an item of cookware in the vicinity of or on the connection and is thus not rigid, and the window may thus move with use. This movement is detrimental to the perception of the screen display through the window.

This problem of good perception of the screen display through the window is even more important since it is now possible to produce small-size screens having very high levels of resolution; however, if the last element interposed between the screen and the viewer is not well designed, then the final resolution will be seriously affected thereby.

The provision of a seal comprising silicone between a base plate and a window is furthermore known from European patent applications EP 570 670 and EP 2 226 565, and also from German patent application DE 10 2007 021 939. Such a seal is heat resistant but expensive and is difficult to employ in a large-scale industrial manufacturing method, in particular by molding.

BRIEF SUMMARY OF THE INVENTION

The aim of the invention is to remedy the drawbacks of the prior art and to provide a low-cost solution that is easy to implement so as to provide sealing between the window and the base plate with respect to the outside with the aid of a seal and to protect this seal with respect to a hot item of cookware positioned in the vicinity of this seal, or even on or above this seal.

Another aim is to provide a solution for reliably and precisely positioning and reliably and precisely securing a display screen with respect to a window provided in a cooktop and through which the display of this screen can be seen.

The present invention thus relates in its broadest sense to a cooktop for a fixed or mobile cooking appliance according to claim 1. This cooktop has a base plate, in particular a glass-ceramic base plate, having a side edge, an outer surface and a peripheral outer edge which forms a plane and which is located at the intersection between said side edge of said base plate and said outer surface of said base plate, said cooktop having at least one cooking area and at least one control and/or information area, said control and/or information area having a window that is separated from said base plate and has a side edge, an outer surface and a peripheral outer edge located at the intersection between said side edge of said window and said outer surface of said window, said cooktop also having a seal made of synthetic material which is located between a part of the side edge of said base plate and a part of the side edge of said window so as to provide sealing between the window and the base plate with respect to the outside, said seal having an outer surface.

This cooktop is noteworthy in that:
  at least a part, or all, of the peripheral outer edge of said window is in the plane of the outer edge of said base plate, and in that
  at least a part of the outer surface of said seal which is located between the outer surface of said base plate and the outer surface of said window is covered by an end plate which is made of different material than that of the seal.

The seal provides sealing with respect to the outside. It is in contact with at least half the height of the side edge of said base plate and is in contact with at least half the height of the side edge of said window; it ensures sealing so as to prevent any fluid coming from the outside from penetrating between these two side edges.

It is not the end plate which ensures sealing with respect to the outside but rather the seal; the end plate is on or above the seal in order to protect the latter.

It is possible for only a part of the outer edge of said window to be in the plane of the outer edge of said base plate.

It is possible, furthermore, for at least a part, or all, of the outer edge of said window not to be in the plane of the outer edge of said base plate.

The present invention thus proposes protecting the seal which is provided at least partially around the window, between the window and the base plate, so as to prevent contact between a hot item of cookware and this seal.

Thus, preferably, the seal which is located between a part of the side edge of said base plate and a part of the side edge of said window does not include silicone.

A first option consists in choosing the material of the end plate such that it has a transformation point Tg from solid to viscous, or a melting point Tf, which is greater than the transformation point Tg' of the material of said seal, in order that the end plate provides additional heat resistance. Preferably, the material of said end plate has a transformation point Tg from solid to viscous, or a melting point Tf, which is at least 20° C., and more preferably at least 50° C., greater than the transformation point Tg' of the material of said seal.

A second option consists in choosing the material of the end plate such that it has a transformation point Tg from solid to viscous, or a melting point Tf, which is greater than 200° C., and preferably greater than 250° C., or even greater than 300° C. Thus, the material of the end plate will be resistant to the presence of and contact with a source of heat respectively at 200° C., or 250° C., or even 300° C.

It is possible to choose the material of the seal such that it has a transformation point Tg from solid to viscous, or a melting point Tf, which is less than or equal to 200° C., or even which is less than or equal to 180° C. Thus, it is not necessary to choose a seal material such that it has a very high transformation point Tg from solid to viscous, or a very high melting point Tf. For example, some thermoplastic silicone materials may be resistant (that is to say without modification of their mechanical properties) to temperatures up to 225° C., or even up to 320° C., but these materials are generally very expensive and difficult to employ.

In the context of the present document, the expression "transformation point Tg from solid to viscous" should be understood as meaning a "glass transition temperature, Tg", in the usual sense.

It is furthermore possible for an air gap and/or an insulating element (for example made of polystyrene foam or polyurethane foam or of ceramic or comprising mineral fibers and in particular glass fibers) to be interposed between said end plate and said seal, under a part of said end plate in order to further improve the effect of seal protection by the end plate.

There is preferably only one end plate according to the invention. It is preferably present along the entire length of that part of the seal that separates said window from said base plate. If a plurality of end plates are provided along the seal, the distance between two end plates should be less then or equal to 2 mm in order to preserve the effect of protection against heat.

The seal preferably covers at least a part of the length of the outer edge of said base plate and/or the seal preferably covers at least a part of the length of the outer edge of said window.

The end plate may be flush with at least a part of the length of the outer edge of said base plate and/or may be flush with at least a part of the length of the outer edge of said window in order to obtain good visual integration of the end plate.

It is furthermore preferable that, as seen in vertical section in at least one location, said seal has a visible outer surface (that is to say one that is not covered by an end plate part) having a width less than or equal to 2 mm, said end plate preferably covering the entire outer surface of the seal which is located between the outer surface of said base plate and the outer surface of said window, in order to be certain that the heat from an item of cookware cannot damage the seal.

In a particular version, said end plate has two parts, as seen in vertical section in at least one location:
  a substantially vertical part located above the plane of the outer surface of said base plate, and
  an approximately horizontal part located flush with at least a part of the outer edge of said window or located above at least a part of the outer edge of said window.

In another particular version, said end plate has an S shape, as seen in vertical section in at least one location, with the top part of the S being located flush with at least a part of the outer surface of said window or being located above at least a part of the outer surface of said window, and the bottom part of the S extending toward said base plate and being located above the outer surface of said base plate.

In another particular version, said end plate has an S shape, as seen in vertical section in at least one location, with the top part of the S being located flush with at least a part of the outer edge of said window or being located above at least a part of the outer edge of said window, and the bottom part of the S extending toward said base plate and being located lower down than the plane of the outer surface of said base plate.

In another particular version, the end plate has a C or ç shape, as seen in vertical section in at least one location, with the top part of the C being located flush with at least a part of the outer edge of said window or being located above at least a part of the outer edge of said window, and the bottom part of the C extending toward said window and being located above the plane of the outer surface of said base plate.

Preferably, the cooktop has a control and/or display screen under said window. It is thus possible for it to be the seal and/or the end plate which has (have) means for securing this control and/or display screen under said window.

The present invention thus proposes the direct use of the seal which is provided at least partially around the window, between the window and the base plate, in order to correctly position and secure the control and/or display screen with respect to this window and/or the direct use of the end plate protecting the seal which is provided at least partially around the window, between the window and the base plate, in order to correctly position and secure the control and/or display screen with respect to this window.

The window which is thus located above the control and/or display screen is transparent in order to make it possible to see what is displayed on the screen through it; it is made of a different material than that of the base plate; the screen is of the LCD, LED or OLED type or may be a touch screen.

The screen is secured to the seal preferably mechanically and thus not chemically (in particular by adhesive bonding).

The seal thus preferably has a central part which is located both opposite at least a part of the side edge of the window and opposite a part of the perimeter of the hole which is made in the base plate and which accommodates the window.

According to an important feature of the invention, said seal preferably has an inner seal part extending under an inner surface of said base plate and/or under an inner surface of said window. This inner part thus makes it possible to increase the mechanical integrity of the connection between the seal and said base plate and/or said window, respectively.

This inner seal part may have for example a C or L shape, in vertical section, under the inner surface of the window.

According to variants of the invention, the cooktop may have:
- at least one insert which is integrated completely into said seal,
- both a flange which is integrated at least partially, or even completely, into a material portion of said seal, and at least one projecting element that projects at least partially, or even entirely, out of said seal, in order to secure said control and/or display screen;
- at least one screw and/or a mounting and/or a clip and/or a rail, for securing the control and/or display screen to said seal.

It is furthermore possible for at least a part of an outer surface of said window (in the case in which the window is inclined with respect to the base plate), or even the entire outer surface of said window (in the case in which the window protrudes or is set back with respect to the base plate), not to be in the plane of an outer surface of said base plate.

Preferably, said seal has an outer seal part extending above a central seal part and optionally extending over an outer surface of said base plate and/or over an outer surface of said window.

The present invention also relates to a fixed or mobile cooking appliance provided with a cooktop according to the invention.

The present invention also relates to a plurality of ways of manufacturing the cooktop according to the invention.

In a first method for manufacturing the cooktop according to the invention, said base plate, said window and said end plate at least are placed in a mold which is then closed and a synthetic material is then injected into a molding cavity in order to form said seal.

In a second method for manufacturing the cooktop according to the invention, a preformed seal comprising said end plate at least is adhesively bonded to said base plate and/or to said window.

In a third method for manufacturing the cooktop according to the invention, said seal comprising said end plate at least is molded against said base plate or against said window, said window or said base plate, respectively, then being introduced into a groove in a frame formed by the seal when the latter is hot.

Advantageously, the present invention makes it possible, in a cooktop, to protect the seal located between the base plate and the window from heat in a simple and effective manner. It is thus not necessary to employ a very complex and very expensive seal which would in itself have the capacity to resist the heat from an item of cookware placed in the vicinity of or above said seal. The end plate thus forms a housing for effectively protecting the seal from the heat which may affect its properties and/or its appearance.

Also advantageously, the seal according to the invention makes it possible to protect the side edge of the window, even if this window is not flush with the surface of the plate (projecting from the outer surface of the plate but parallel to the plate) or if this window is inclined with respect to the plate.

Also advantageously, the seal according to the invention makes it possible to position and to secure a control and/or display screen with precision in all three dimensions of space with respect to a window located above it. The positioning precision and securing precision may be achieved for example to a tenth of a millimeter.

Also advantageously, the seal according to the invention makes it possible to ensure sealing with respect to fluids between the side edge of the window and the perimeter of the hole produced in the plate, even if this window is not flush with the surface of the plate (projecting from the outer surface of the plate but parallel to the plate) or if this window is inclined with respect to the plate.

Also advantageously, the solution according to the invention is applicable even when the control and/or information area is located on the edge of the cooktop.

Furthermore advantageously, the fact that the control and/or display screen is secured to the seal and/or to the end plate makes it possible to easily change the screen if need be (in the event of a faulty screen): all that is needed is to gain access under the cooktop and to undo the means for securing the screen; in addition, it is easy and inexpensive to change the faulty screen for a correctly operating screen which will in turn be positioned with precision and secured with precision with respect to the window; it is not necessary to change the base plate, or the window, or to redo the seal between the base plate and the window.

It is moreover possible to provide for the end plates not to have the same outward appearance and in particular not to have the same outer surface color from one cooktop to another, so as to make it possible to "personalize" the cooktops of one and the same range.

BRIEF DESCRIPTION OF THE SEVERAL VIEWS OF THE DRAWINGS

The present invention will be understood better from reading the following detailed description of nonlimiting exemplary embodiments and the appended drawings.

DETAILED DESCRIPTION OF THE INVENTION

It should be noted that the proportions between the various elements shown are not strictly respected in these figures and the background elements are not all shown in order to make it easier to read them. In particular, the distance shown in the figures between the base plate and the window has no limiting meaning.

Figure 1:
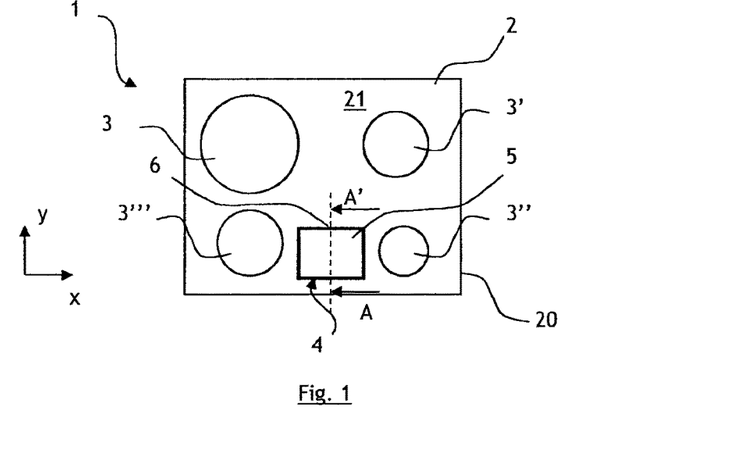
FIG. 1 illustrates a schematic top view of a cooktop according to the invention with a base plate having a complete hole and a window in this hole.

FIG. 1 illustrates an exemplary embodiment of a cooking appliance according to the invention. The appliance illustrated here has the general shape of a right parallelepiped.

The appliance illustrated here is a fixed cooking appliance, also known as an "integrated appliance", which is intended to be installed in a bay provided in a work surface or in a stove and which, once installed and secured, can no longer be moved; however, the present invention is also applicable to a mobile cooking appliance which is in the form of a casing and may be positioned, for example, on a work surface or on a dining table and which may be moved manually.

The cooking appliance has a cooktop 1 which is flat and has the general shape of a right parallelepiped (that is to say the shape of a rectangle or square when viewed from above).

This cooktop 1 has a base plate 2 which may in particular be a glass-ceramic plate.

Even though the most common shape for the base plate is a rectangular shape when viewed from above, the base plate may also have a circular, bean-shaped or trapezoidal shape when viewed from above; the only shape constraint is the one connected with the way of manufacturing the base plate.

The base plate 2 has an outer surface 21 which is intended to be positioned horizontally and on which the cookware (saucepans and the like) to be heated stands. In the rest of the description, the cooktop 1 according to the invention is considered to be positioned horizontally and the positions: under/below and on/above are realized with respect to the vertical.

The base plate 2 also has an inner surface 22 which is located opposite its outer surface 21, and also a peripheral side edge 20 located between these two surfaces.

The base plate 2 furthermore has a peripheral outer edge 27 which is located at the junction between its side edge 20 and its outer surface 21 and which forms a plane. This plane is thus defined for the perimeter of the base plate 2 which is formed by the outer edge 27.

Even though a base plate is generally flat, it is possible for a base plate to be curved, in particular toward the inside of the cooking appliance. In this case, the curved shape is produced on the inside of the peripheral perimeter of the base plate which is defined by the outer edge 27, in order that this outer edge always forms a plane.

The cooktop 1 has in this case four cooking areas 3, 3', 3", 3''', which are represented here by circles having different diameters, but which may have any shape.

The cooktop 1 furthermore has a control and/or information area 4.

Positioned under each cooking area is a heating element (not illustrated) such as a radiant or halogen heater and/or at least one gas burner and/or at least one induction heating coil. Furthermore, also for simplification, the power supply of the heating element has not been illustrated.

The control and/or information area 4 is the location from where it is possible to control the operation of each cooking area 3, 3', 3", 3''' and/or where it is possible to display the information relating to the operation of each cooking area 3, 3', 3", 3'''.

Here, the single control and/or information area 4 is the location from where it is possible to independently control the operation of all of the cooking areas 3, 3', 3", 3''' and where it is possible to independently display the information relating to the operation of all of these cooking areas 3, 3', 3", 3'''; however, there may be for example two control and/or information areas, with, for each control and/or information area, the possibility of independently controlling the operation of two of the four cooking areas and the possibility of independently displaying the information relating to the operation of these two cooking areas.

It is furthermore possible for the (or each) control and/or information area to make it possible to control (a) further appliance(s) and/or to display the information relating to the further appliance(s), or even to display any type of information.

The control and/or information area 4 is formed by a window 5 which is made from a different material than that of the base plate 2.

In particular, when the base plate 2 is made of glass ceramic, the constituent material of said base plate 2 prevents clear and precise transmission of information through it.

The window 5 is preferably made of glass, optionally thermally or chemically toughened glass or optionally hardened glass. It is transparent, with integrated light transmission in the visible greater than 70% (measured for example under the illuminant D65); it is clear and preferably has a haze less than 50%.

It is possible to provide a transparent polymer film under a sheet of glass in order to form a particularly strong window 5.

The window 5 is separated, preferably without direct physical contact, from the base plate 2 by a seal 6 made of synthetic, non-mineral material.

Here, the window 5 has the shape of a rectangle when viewed from above and is positioned in a hole which has a similar shape but the perimeter 25 of which is a little larger and a little longer than the window and which has previously been made in the base plate 2. This hole is a through-hole in the sense that it opens out onto the outer surface 21 of the base plate 2 and onto the opposite surface thereof: the inner surface 22 of the base plate 2 (not shown in FIG. 1); this hole, which is in the form of a parallelepiped, is a complete hole in the sense that all of its outer periphery is produced in the outer surface 21 and all of its inner periphery is produced in the inner surface 22.

Even though the most common shape for the window is a rectangular shape when viewed from above, the window may also have a circular, bean-shaped or trapezoidal shape when viewed from above; the only shape constraint is the one connected with the way of manufacturing the window.

The window 5 has an outer surface 51 which is oriented in space like the outer surface 21 of the base plate 2, that is to say which is on the top of the cooking appliance.

The window 5 also has an inner surface 52 which is located opposite its outer surface 51, and also a peripheral side edge 50 located between these two surfaces.

The side edge 50 of the window 5 is smaller than the perimeter 25 of the hole in the base plate when the window is located in this hole; however, the window 5 may also be positioned above this hole, being larger than this hole, and it is then possible for the side edge 50 of the window 5 to be larger than the perimeter 25 of the hole in the base plate.

The window 5 furthermore has a peripheral outer edge 57 which is located at the junction between its side edge 50 and its outer surface 51 and which forms a plane. This plane is thus defined for the perimeter of the window 5 which is formed by the outer edge 57.

Even though a window 5 is generally flat, it is possible for a window 5 to be curved, in particular toward the inside of the cooking appliance. In this case, the curved shape is preferably produced on the inside of the peripheral perimeter of the window 5 which is defined by the outer edge 57, in order that this outer edge forms a plane, in order to make it easier to integrate the window 5 with respect to the base plate 2.

The seal 6, which is located between a part of the side edge 20 of the base plate 2 and a part of the side edge 50 of the window 5 and which thus produces a material junction between the side edge of the base plate and the side edge of the window, also has an outer surface 61 which is also orientated in space like the outer surface 21 of the base plate 2, that is to say which is on the top of the cooking appliance.

The seal 6 may be for example based on a thermoplastic; it may be based on or made of: polycarbonate, polyvinyl chloride or polyurethane; all of these materials have a melting temperature which is less than or equal to 200° C. and even which is less than or equal to 180° C.

At least a part of the outer surface 61 of the seal 6 which is located between the outer surface 21 of said base plate 2 and the outer surface 51 of the window 5 is covered by an end plate 66, 66' which is made of different material than that of the seal 6.

The end plate 66 thus protects the seal 6 in the configuration in which at least a part, or all, of the outer edge 57 of the window 5 is not in the plane of the outer edge 27 of the base plate 2, as can be seen in FIGS. 5 to 8, 9 to the right, 10 and 11.

The end plate 66' thus protects the seal 6 in the configuration in which at least a part, or all, of the outer edge 57 of the window 5 is in the plane of the outer edge 27 of the base plate 2, as can be seen in FIGS. 2 to 4 and 9 to the left.

The end plate 66, 66' may be made for example of stainless steel, having a thickness of 2 mm, or optionally even less. The melting temperature of the material of the end plate is greater than 200° C., and even greater than 250° C., and even greater than 300° C.

In a variant shown in FIGS. 2, 3 and 5 to 11, said seal 6 has means for securing a control and/or display screen 7 under the window 5 directly or indirectly to the seal 6, in all three dimensions of space x, y, z, such that the orientation of said screen with respect to the window 5 remains unchanged as soon as the screen is rigidly secured to said window and it is thus possible to view the display of the screen 7 through the window 5.

Figure 4:
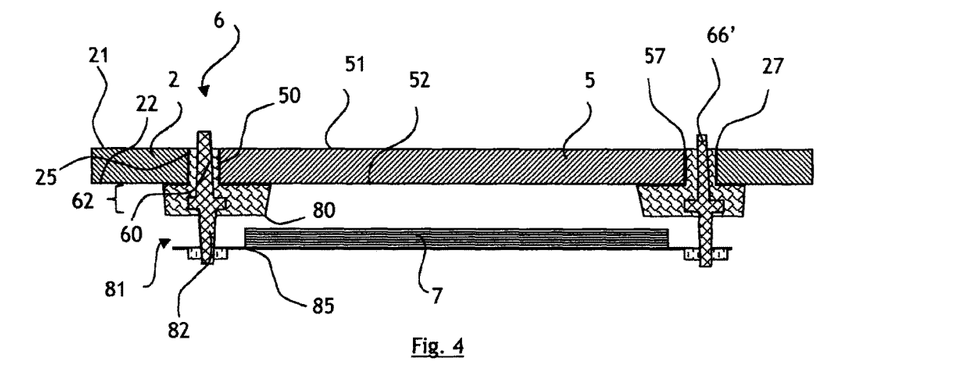

In another variant which is shown in FIG. 4, it is the end plate 66' which has means for securing a control and/or display screen 7 under said window 5. Although not illustrated, this variant also applies to the end plate 66, which thus protects the seal 6 in the configuration in which at least a part, or all, of the outer edge 57 of the window 5 is not in the plane of the outer edge 27 of the base plate 2.

In these two variants, the screen 7 is thus correctly parallel to the window 5 and viewing the display is ideal. There is no deformation of the image through the window 5.

Preferably, the window is attached at its edge to the base plate 2 only by the seal 6 or the end plate 66, 66' depending on the variant.

The seal 6 is present around the entire periphery of the window 5, or in any case along the periphery of the window 5 which is opposite the base plate 2.

The end plate 66, 66' is thus present around the entire periphery of the window 5, or in any case along the periphery of the window 5 which is opposite the base plate 2, in order to protect the seal.

The seal 6 thus has a central part 60 which is located both opposite at least a part of the side edge 50 of the window 5 and opposite at least a part of the perimeter 20 of the hole which is made in the base plate 2 and which accommodates the window 5.

As explained below, this central part 60 may be located opposite at least a part of the side edge of the window 5 over the length and/or the height of this side edge 50 and this central seal part 60 may be located opposite at least a part of the perimeter 25 of the hole over the length and/or the height of this hole.

According to one feature of the invention, the seal 6 preferably has an inner seal part 62 extending under the inner surface 22 of the plate 2 and/or under the inner surface 52 of the window 5.

The seal 6 has an inner seal part 62 which preferably extends both under the inner surface 22 of the plate 2 and under the inner surface 52 of the window 5, as illustrated with the aid of FIGS. 2 to 11, in order to improve the mechanical integrity between the window 5 and the base plate 2 by way of the seal 6.

Figure 2:
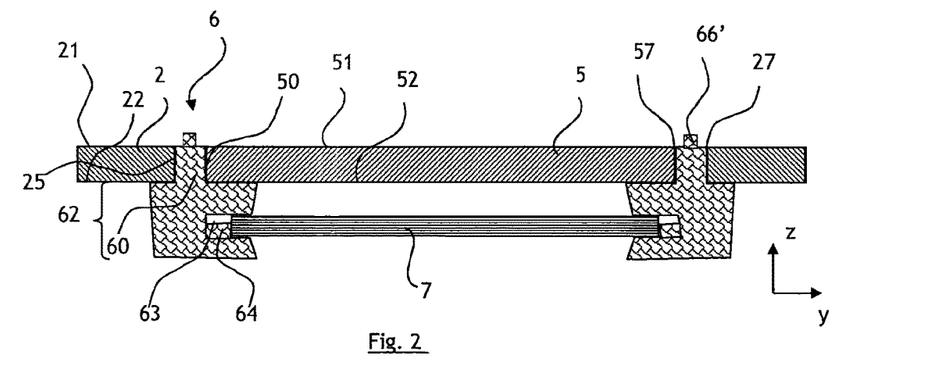
FIG. 2 illustrates a partial vertical sectional view on AA' in FIG. 1.
Figure 5:
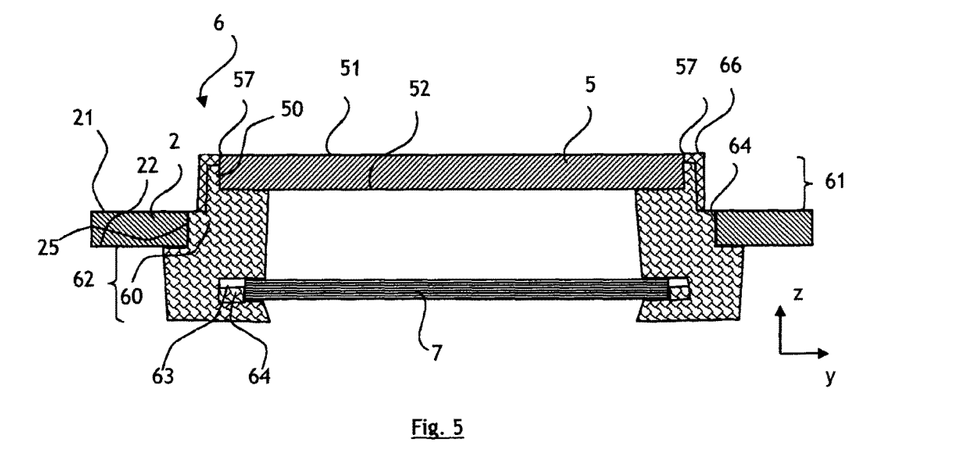

In a first sub-variant embodiment of the invention, it is the seal 6 itself which makes it possible to directly attach the screen 7; to this end, the inner seal part 62 has, under the inner surface 52 of the window 5, in vertical section:
  either a C shape, such as to be able to accommodate a part of the control and/or display screen 7 in a groove 63 created between the arms of the C, as illustrated in FIGS. 2 and 5,
  or an L shape, such as to be able to rest the screen 7 on the base of the L, between this base and the inner surface 52 of the window 5.

In these two configurations, it is possible for the inner seal part 62 to extend under the inner surface 22 of the plate 2.

In these two configurations, the C or L shape is sufficiently elongate to allow the formation of a rail for accommodating two sides of the screen 7.

With these configurations, it is thus possible to slide the screen 7 in the direction x in order to correctly position it under the window 5. Immobilization in the direction y is ensured by at least one abutment 64 which is present in each groove 63. Immobilization in the direction z is ensured by the fact that the height of the groove 63 is approximately the same as the thickness of the screen 7, or at least the same as the thickness of the part of the screen 7 which is intended to slide inside the groove.

With reference to FIG. 1, the screen may thus be slid under the window 5 from the right or from the left in the groove 63; it is also possible to provide that a left-hand or right-hand edge of the seal 6 is also provided with an L-shaped or C-shaped inner seal part 63, in order that the screen is held on three sides once it is positioned correctly under the window 5.

In order to increase the mechanical integrity of the seal 6, it is possible to provide for it to have an insert completely integrated into the material of the seal. This insert is preferably metallic, with a coefficient of expansion which is preferably relatively low and which is adapted to the thermal constraints of manufacturing the seal 6 and of operating the cooking appliance.

The insert may be perforated in order that the material of the seal passes through the perforations and thereby increases the mechanical integrity between the insert and the seal.

Viewed in section, the insert may be positioned at least partially in the central seal part 60 and/or in the outer seal part 61 and/or in the inner seal part 62.

In an alternative to the first sub-variant embodiment of the invention, it is not the seal 6 itself which makes it possible to directly attach the screen 7, but an accessory fastened to the seal 6 which makes it possible to indirectly attach the screen 7 to the seal 6.

This accessory may be for example an insert as indicated above, but having both a flange 80 which is integrated at least partially, or even completely, into a material portion of said seal 6, and at least one projecting element 81 that projects at least partially, or even entirely, out of said seal 6, in order to secure said control and/or display screen 7. The projecting element 81 extends approximately perpendicularly to the general plane of the flange 80.

The flange 80 may be provided along the two, left-hand and right-hand, edges of the window 5 (with reference to the positioning in FIG. 1). It makes it possible to strengthen the mechanical connection between the seal 6 and the screen 7.

Figure 3:
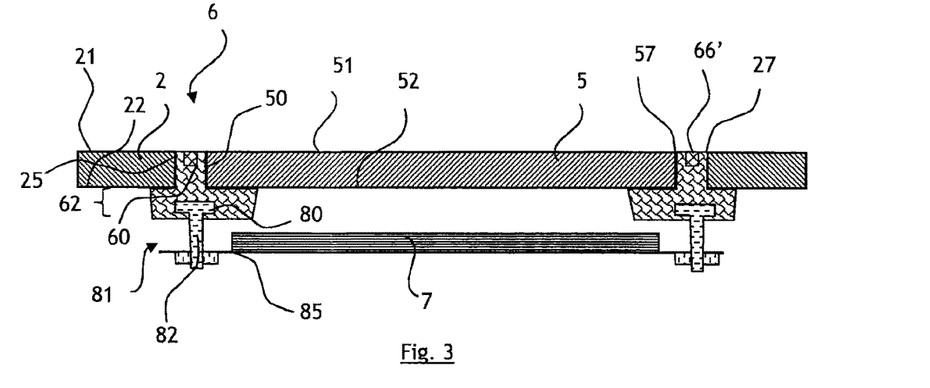
FIGS. 3 to 11 respectively illustrate a section equivalent to the one in FIG. 2 for further variant embodiments of the invention.
Figure 6:
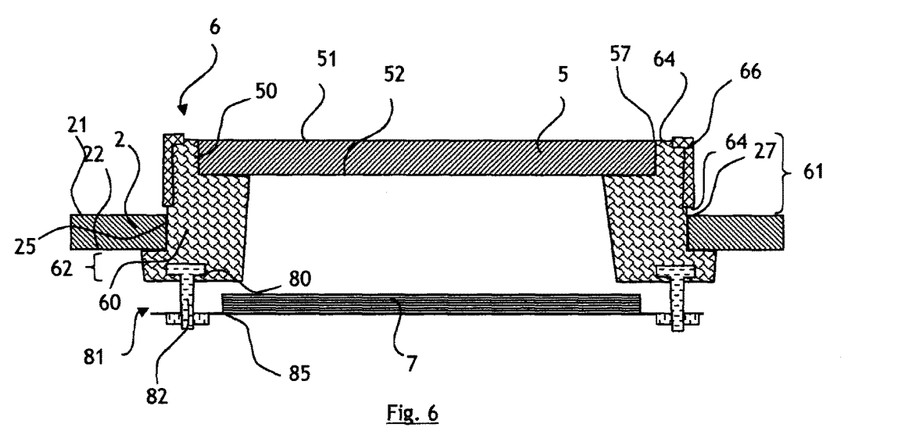
Figure 7:
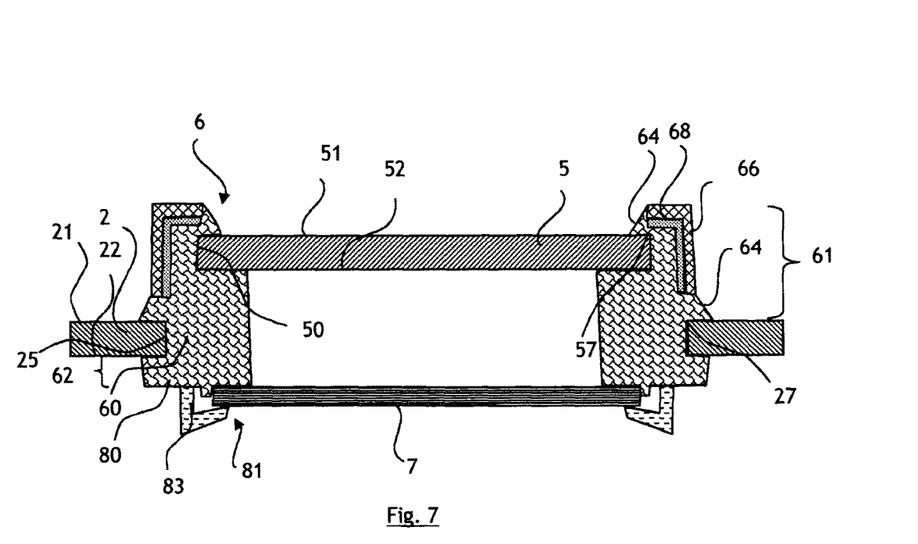
Figure 8:
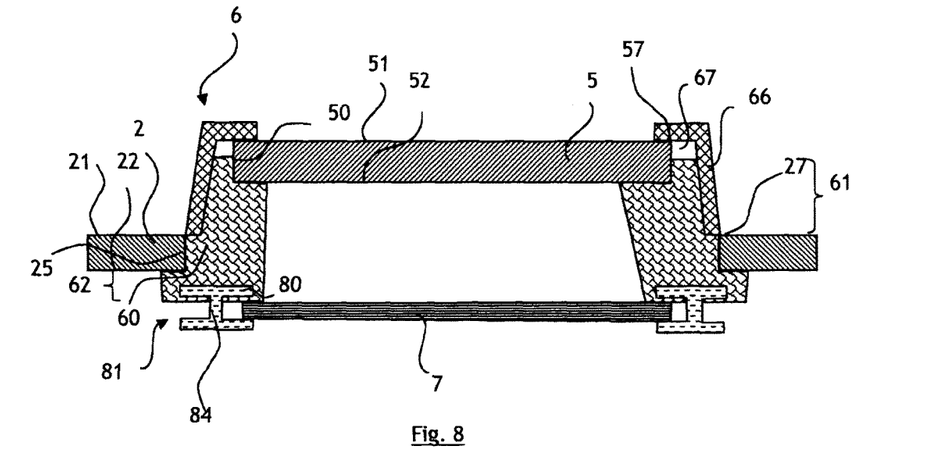

The projecting element 81 may be in various forms:
- in FIGS. 3, 4 and 6, the projecting element is a screw 82, welded to the flange 80 at its top end and provided with a thread in its bottom part so as to screw on a nut; preferably, two screws are provided at least along each of the two, left-hand and right-hand, edges of the window 5 in order to make it possible to hold a mount 85, which is fitted onto the screws 82 and on which the screen 7 is secured, thereby making it possible to secure the screen indirectly to the seal 6 in all three dimensions of space;
- in FIG. 7, the projecting element is a bent L-shaped mount 83 (or clip); two mounts 83 are preferably provided along each of the two, left-hand and right-hand, edges of the window 5, in order to make it possible to position and secure the screen 7 correctly under the window 5; for better retention, it is possible to provide for the screen to be sandwiched on each, left-hand and right-hand, side between the mount 83 and the inner seal part 62; this mount 83 may be manufactured for example by bending;
- in FIGS. 8 to 11, the insert is an H-shaped rail 84; a rail 84 is preferably provided along each of the two, left-hand and right-hand, edges of the window 5 in order to make it possible to slide the screen 7 on the rails in order to correctly position it under the window 5; for better retention, it is possible to provide for the screen to be sandwiched on each, left-hand and right-hand, side between the projecting part of the rail 84 and the inner seal part 62; this rail may be manufactured for example by extrusion.

As a variant, the projecting element may be a clip in the manner of the clips that are known for securing glazing in the aperture in a vehicle body.

It is possible to furthermore provide that a nut be fastened (for example welded) to a projecting part of an insert.

As can be seen in FIGS. 2 to 4, it is possible to provide for the window 5 to have the same thickness as the base plate 2 and for the outer surface 51 of the window 5 to be exactly flush with the outer surface 21 of the base plate 2.

However, it is also possible for the window 5 to be less thick than the plate 2 and for the seal 6 thus to compensate for this difference in thickness so as to allow the outer surface 51 of the window 5 to be exactly flush with the outer surface 21 of the base plate 2; in this case, the inner surface 52 of the window 5 is set back upwardly from the inner surface 22 of the base plate 2.

In FIGS. 2 to 4, the central seal part 60 makes it possible to produce surface continuity between the outer surface 51 of the window 5 and the outer surface 21 of the base plate 2 by filling the space available between these two surfaces very exactly in a fluid-tight manner. There is also surface continuity between the outer edge 57 of the window 5 and the outer edge 27 of the base plate 2.

In FIG. 2, the seal 6 is flush with the outer edge 27 and with the outer edge 57, but the end plate 66' is raised with respect to the plane defined by the outer edge 27. The end plate 66' has a rectangular or square shape in vertical section. This raised position of the end plate prevents any contact between an item of cookware and the seal 6 by producing a vertical abutment.

In FIG. 3, the end plate 66' is positioned flush, with its outer face in the plane defined by the outer edge 27.

In FIG. 4, the window 5 also has the same thickness as the base plate 2 and the seal 6 is also flush with the outer edge 27 and with the outer edge 57 and the end plate 66' is also raised with respect to the plane defined by the outer edge 27, but in addition, means for securing the control and/or display screen 7 under said window 5 are fastened to the end plate 66'. In addition, the end plate 66' has, in vertical section, in its part above the plane defined by the outer edge 27, a trapezoidal shape with the wide base of the trapezium at the bottom. This raised position of the end plate prevents any contact between an item of cookware and the seal 6 by producing a vertical abutment. It is possible to provide holes in the end plate in order that the material of the central seal part 60 passes through the end plate for a better hold.

In FIGS. 5 to 8, the outer surface 51 of the window 5 projects upwardly from the outer surface 21 of the base plate 2; the outer surface 51 of the window 5 is thus raised with respect to the outer surface 21 of the base plate 2. In this configuration, none of the outer edge 57 of said window 5 is in the plane of the outer edge 27 of said base plate 2.

This may be obtained for example by providing:
- that the inner surface 52 of the window 5 is exactly flush with the inner surface 22 of the base plate 2 but that the window 5 is thicker than the base plate 2; or
- that the window 5 has approximately the same thickness as the base plate 2 and that the inner surface 52 of the window 5 is also set back, upwardly, from the inner surface 22 of the base plate 2.

FIG. 5 illustrates the fact that the central seal part 60 produces the joint along the entire periphery of the window 5 between the side edge 20 of the base plate 2 and the side edge 50 of the window 5, in order to protect the side edge 50 of the window 5. This protection is completed by the end plate 66.

As a variant, it is possible to provide for some peripheral edges, or even all of the peripheral edges, of the outer surface 51 of the window 5 to be beveled (non-right angle).

It is possible to provide for the window 5 to allow a magnifying glass effect with respect to the screen 7 for any observer looking at the screen 7 from above the window 5, either by way of a sheet of glass having a particular focal length or by way of a transparent polymer film adhesively bonded to the inner surface 52.

Figure 9:
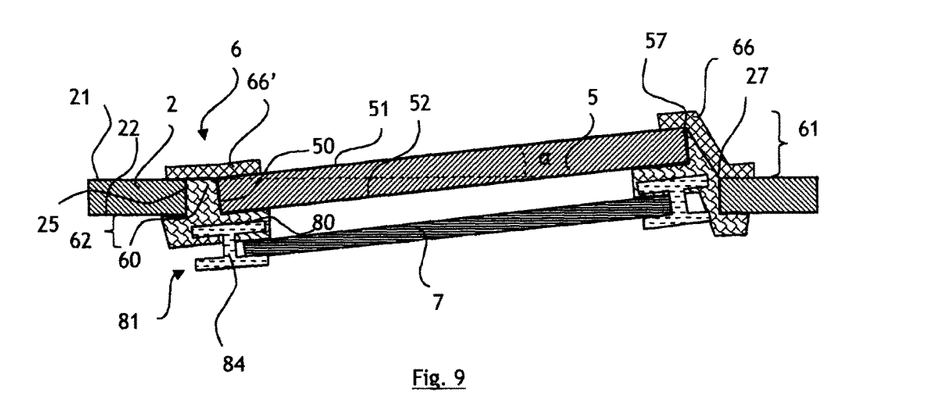
Figure 10:
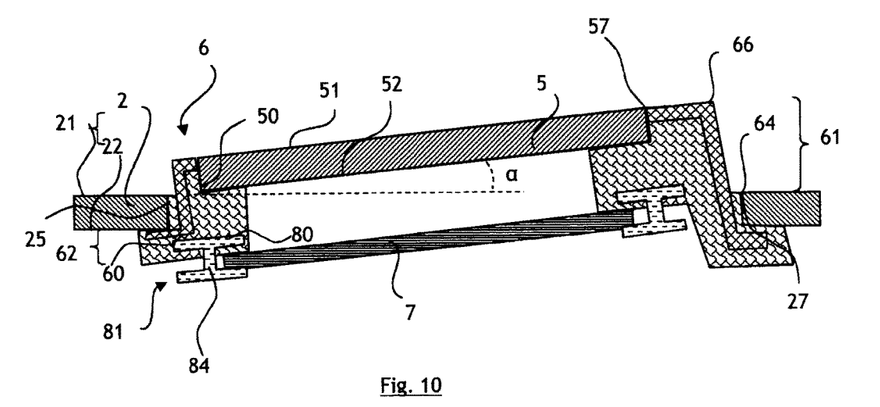
Figure 11:
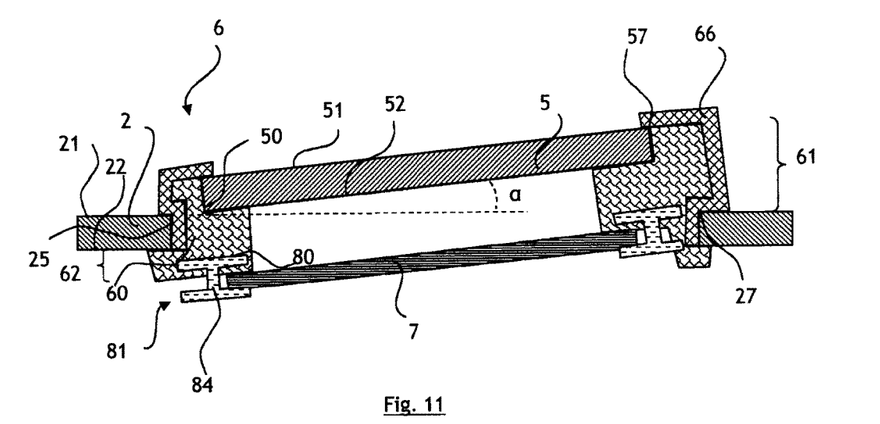

In FIGS. 9 to 11, unlike all of the preceding variants, the window 9 is not positioned parallel to the base plate 2, but inclined with respect to this plate, at an angle α of between 2° and 45°, or even between 5° and 25°.

In the configuration in FIG. 9, only a part of the outer edge 57 of said window 5 (on the left in the figure) is in the plane of the outer edge 27 of said base plate 2 and a part of the outer edge 57 of said window 5 (on the right in the figure) is not in the plane of the outer edge 27 of said base plate 2.

FIG. 9 also illustrates the fact that the central seal part 60 produces the sealed joint along the entire periphery of the window 5 between the side edge 20 of the base plate 2 and the side edge 50 of the window 5, in order to protect the side edge 50 of the window 5. This protection is completed by the end plate 66' on the left of the figure and by the end plate 66 on the right of the figure.

For FIGS. 10 and 11, again, none of the outer edge 57 of said window 5 is in the plane of the outer edge 27 of said base plate 2. The central seal part 60 produces the sealed joint along the entire periphery of the window 5 between the side edge 20 of the base plate 2 and the side edge 50 of the window 5, in order to protect the side edge 50 of the window 5 and this protection is completed by the end plate 66.

Figure 12:
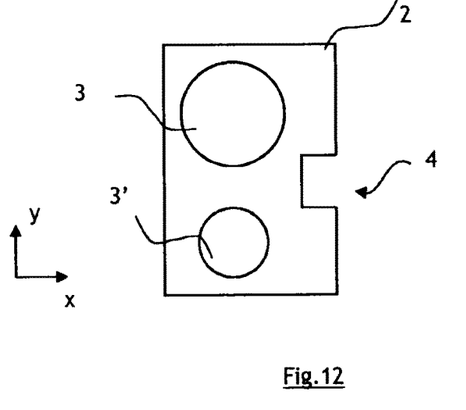
FIG. 12 illustrates a schematic view of another base plate according to the invention having a cutout for accommodating a window.

FIG. 12 illustrates another base plate 2: unlike the base plate in FIG. 1, only two cooking areas 3, 3' are provided.

Furthermore, unlike the base plate in FIG. 1, the hole which accommodates the control and/or information area 4 is not a complete hole but a partial hole along one of the edges of the base plate 2 (in this case the right-hand edge).

Thus, this hole is a through-hole in the sense that it opens out onto the outer surface 21 of the base plate 2 and onto the inner surface 22, but this hole is not a complete hole in the sense that its periphery, as much for the outer surface as for the inner surface, is not closed.

In this case, the seal 6 is present only along three sides of the periphery of the window 5, or in any case along the periphery of the window 5 which is opposite the base plate 2. An end plate according to the invention protects the seal in order to prevent any contact of the seal with a hot item of cookware.

It is possible to provide for the window 5 to extend beyond the edge (in this case the right-hand edge) of the base plate 2 in which the cutout which forms the hole is provided.

For this variant in FIG. 12, it is possible to use one of the seal 6 and end plate 66 or 66' solutions presented in FIGS. 2 to 11.

Regardless of the shape of the hole (FIG. 1 or FIG. 12) in which the window 5 is positioned or above which the window 5 is positioned, this hole is preferably formed by cutting the base plate 2 prior to the ceramification step in the case of a plate based on glass ceramic.

It is possible to provide for the window 5 to be compatible with a touch screen 7 by providing a conductive transparent film on the inner surface 52.

The solutions presented above for securing the control and/or display screen 7 under said window 5 have the significant advantage of it being possible to change the screen 7 as required without it being necessary to change the window 5, and above all without it being necessary to change the seal 6 with its end plate(s), while ensuring that the new screen 7 is positioned and secured correctly with respect to the window 5.

Furthermore, although not depicted, it is possible for the base plate not to be flat. In this case, at least partially along the periphery of the hole in the base plate, the outer surface of the window has a shoulder, toward the inside or the outside.

In order to produce the seal 6 and the end plate(s) 66, 66', a plurality of solutions may alternatively be implemented:

In a first solution, known as the "encapsulation" solution, illustrated by way of FIGS. 13 to 16 in conjunction with the solution in FIG. 3, the base plate 2, the window 5 and the end plate(s) 66, 66' and also the means for securing the control and/or display screen are all arranged in a mold part 90 and then another mold part 91 is closed into the former. A molding cavity 92 is provided between these two mold parts, this cavity having the desired shape of the seal 6 (in this case the shape of the seal in FIG. 3) in its hollow.

Figure 13:
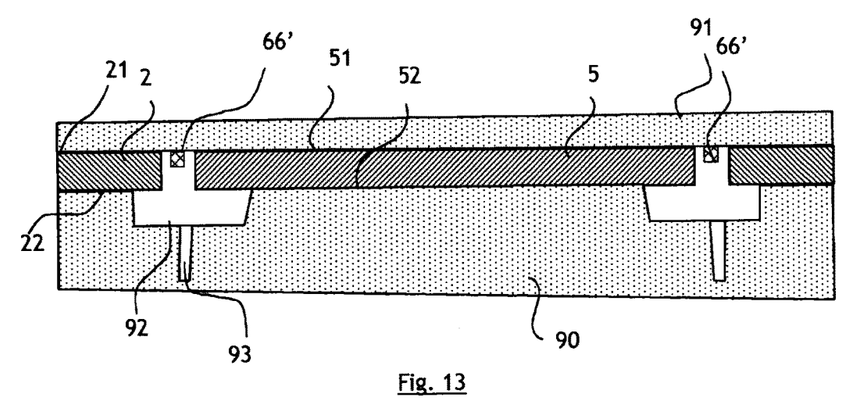
FIG. 13 illustrates a sectional view of an exemplary embodiment of a mold for producing the seal according to an embodiment of the seal according to FIG. 3.

The molding cavity 92 furthermore has hollows 93 for positioning the screws 82 prior to molding in order that the flange 80 of each screw is positioned in the molding cavity but that the threaded part of each screw is protected in order that the material of the seal does not come into contact with the screw thread during the molding of the seal.

Next, a synthetic material is injected into the molding cavity in order to form the seal 6 having the means for securing the control and/or display screen.

This solution is particularly practical to implement when the seal has an insert, since it makes it possible to correctly position the insert with respect to the elements introduced into the mold: the base plate 2, the window 5 and the end plate(s) 66, 66'.

Figure 14:
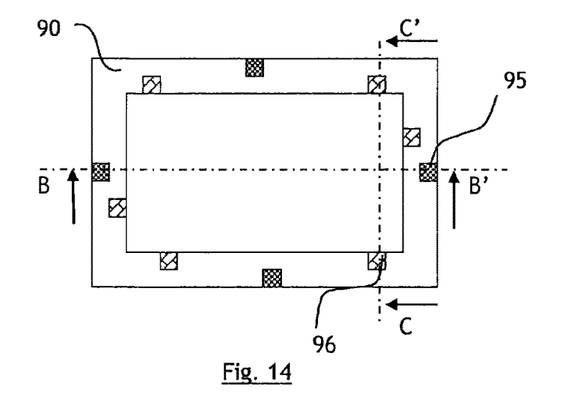
FIGS. 14 to 16 respectively illustrate a top view of a part of the mold from FIG. 13 and a partial vertical sectional view on B-B' and on C-C' in FIG. 14.
Figure 15:
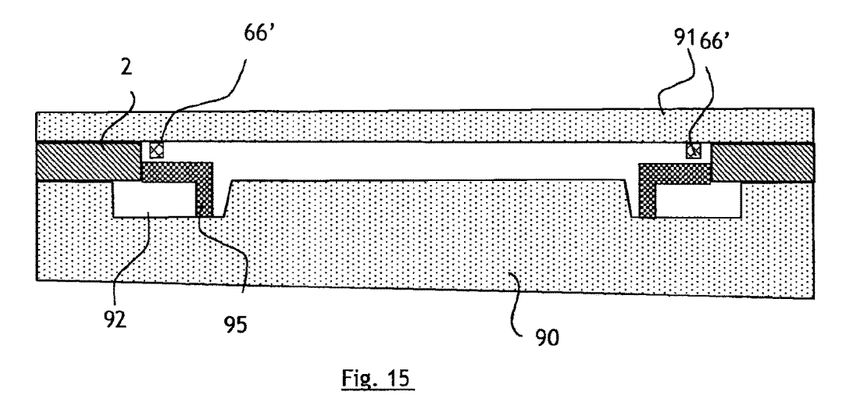
Figure 16:
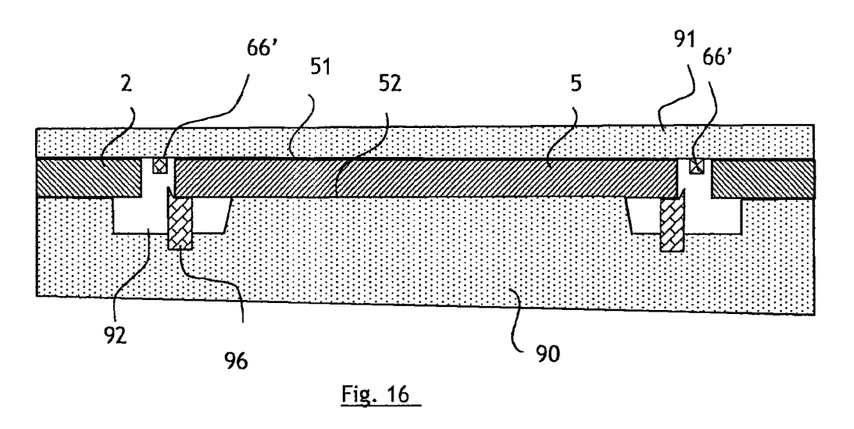

FIGS. 14 to 16 illustrate a way of correctly positioning the base plate 2 and the end plate(s) 66, 66' with respect to the mold part 90 and the window 5 with respect to this mold part 90.

The mold part 90 thus has retractable centering elements 95 for centering the base plate 5 with respect to the mold part 90, and also fixed centering elements 96 for centering the window 5 with respect to the mold part 90.

After the base plate 2 has been centered with respect to the mold part 90 by virtue of the retractable centering elements 95, as in FIG. 10, these elements are retracted into the mold part 90, and then the window 5 is introduced into the mold part and is centered with the aid of the fixed centering elements 96, as in FIG. 11.

It should be noted that for the encapsulation solution, it is not necessary for the mold to accommodate all of the base plate 2; provision may be made for the molding to be carried out only over a part of the base plate 2, the part which has the hole in which the window 5 is secured by way of the seal 6.

In a second solution, known as the "adhesive bonding" solution, the seal 6 is preformed (previously manufactured in the desired shape) and it thus already has the end plate(s) 66, 66' and the means for securing the control and/or display screen 7; next, this seal 6 is adhesively bonded to the base plate 2 and/or to the window 5.

In a third solution, known as the solution "by withdrawal", the seal 6 having the end plate(s) 66, 66' and means for securing the control and/or display screen in a rigid manner is molded against the base plate 2 or against the window 5; next, the window 5 or the plate 2, respectively, is introduced into a groove in the frame formed by the seal 6 when the latter is hot, and the window 5 is thus secured to the base plate 2 by withdrawal of the material forming the seal 6, without chemical adhesion between the seal and the window or the base plate, respectively.

If the seal is molded against the base plate 2, the groove in the frame which accommodates the window 5 is formed by the central seal part 60, the outer seal part 61 extending over the window 5 and the inner seal part 62 extending under the window 5.

If the seal is molded against the window 5, the groove in the frame which accommodates the base plate 2 is formed by the central seal part 60, the outer seal part 61 extending over the base plate 2 and the inner seal part 62 extending under the base plate 2.

The present invention is described in the preceding text by way of example. It will be understood that a person skilled in the art will be able to realize different variants of the invention without otherwise departing from the scope of the patent as defined by the claims.

The invention claimed is:

1. A cooktop for a fixed or mobile cooking appliance, comprising:

a base plate, or a glass-ceramic base plate, including a side edge, an outer surface, and a peripheral outer edge which forms a plane and which is located at the intersection between the side edge and the outer surface;

at least one cooking area and at least one control and/or information area, the control and/or information area including a window that is separated from the base plate and including a side edge, an outer surface, and a peripheral outer edge located at the intersection between the side edge and the outer surface, at least a part of the peripheral outer edge of the window being in the plane of the peripheral outer edge of the base plate;

a seal made of synthetic material which is located between a part of the side edge of the base plate and a part of the side edge of the window to provide sealing between the window and the base plate, the seal including an outer surface;

at least one end plate which is made of different material than that of the seal and is disposed above or on the seal, wherein at least a part of the outer surface of the seal which is located between the outer surface of the base plate and the outer surface of the window being covered by the end plate.

2. The cooktop as claimed in claim 1, wherein the material of the end plate has a transformation point from solid to viscous, or a melting point, which is greater than the transformation point of the material of the seal.

3. The cooktop as claimed in claim 1, wherein the material of the end plate has a transformation point from solid to viscous, or a melting point which is greater than 200° C., or greater than 250° C., or greater than 300° C.

4. The cooktop as claimed in claim 1, wherein the material of the seal has a transformation point from solid to viscous, or a melting point, which is less than or equal to 200° C., or which is less than or equal to 180° C.

5. The cooktop as claimed in claim 1, wherein an air gap and/or an insulating element is interposed between the end plate and the seal, under a part of the end plate.

6. The cooktop as claimed in claim 1, wherein the end plate is present along an entire length of that part of the seal that separates the window from the base plate.

7. The cooktop as claimed in claim 1, wherein the seal covers at least a part of a length of the outer edge of the base plate and/or the seal covers at least a part of a length of the outer edge of the window.

8. The cooktop as claimed in claim 1, wherein the end plate is flush with at least a part of a length of the outer edge of the base plate and/or is flush with at least a part of a length of the outer edge of the window.

9. The cooktop as claimed in claim 1, wherein, as seen in vertical section in at least one location, the seal includes a visible outer surface having a width less than or equal to 2 mm, the end plate covering an entire outer surface of the seal which is located between the outer surface of the base plate and the outer surface of the window.

10. The cooktop as claimed in claim 1, wherein the seal includes means for securing a control and/or display screen under the window.

11. The cooktop as claimed in claim 1, wherein the end plate includes means for securing a control and/or display screen under the window.

12. The cooktop as claimed in claim 1, wherein the end plate includes two parts, as seen in vertical section in at least one location of:
a substantially vertical part located above the plane of the outer surface of the base plate, and
an approximately horizontal part located flush with at least a part of the outer edge of the window or located above at least a part of the outer edge of the window.

13. A fixed or mobile cooking appliance comprising a cooktop as claimed in claim 1.

14. A method for manufacturing a cooktop as claimed in claim 1, wherein the base plate, the window, and the end plate are placed in a mold which is then closed, and a synthetic material is then injected into a molding cavity to form the seal.

* * * * *